(12) United States Patent
Tao et al.

(10) Patent No.: US 11,269,352 B2
(45) Date of Patent: Mar. 8, 2022

(54) SYSTEM FOR BUILDING A VEHICLE-TO-CLOUD REAL-TIME TRAFFIC MAP FOR AUTONOMOUS DRIVING VEHICLES (ADVS)

(71) Applicant: Baidu USA LLC, Sunnyvale, CA (US)

(72) Inventors: Jiaming Tao, Sunnyvale, CA (US); Dong Li, Sunnyvale, CA (US); Yifei Jiang, Sunnyvale, CA (US); Liangliang Zhang, Sunnyvale, CA (US); Jiangtao Hu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 310 days.

(21) Appl. No.: 15/916,127

(22) Filed: Mar. 8, 2018

(65) Prior Publication Data

US 2019/0187723 A1 Jun. 20, 2019

Related U.S. Application Data

(60) Provisional application No. 62/599,419, filed on Dec. 15, 2017.

(51) Int. Cl.
*G05D 1/02* (2020.01)
*G01C 21/34* (2006.01)
(Continued)

(52) U.S. Cl.
CPC ........... *G05D 1/0276* (2013.01); *B60W 30/00* (2013.01); *G01C 21/32* (2013.01);
(Continued)

(58) Field of Classification Search
CPC .............................. G05D 1/0276; B60W 30/00
See application file for complete search history.

(56) References Cited

U.S. PATENT DOCUMENTS 9,123,152 B1 * 9/2015 Chatham ................. H04L 67/42
10,459,444 B1 * 10/2019 Kentley-Klay ......... G05D 1/0027
(Continued)

FOREIGN PATENT DOCUMENTS

CN 105676253 A 6/2016
CN 105741595 A 7/2016
(Continued)

*Primary Examiner* — Jess Whittington
(74) *Attorney, Agent, or Firm* — Womble Bond Dickinson (US) LLP

(57) ABSTRACT

In one embodiment, a system monitors states of an autonomous driving vehicle (ADV) using a number of sensors mounted on the ADV. The system perceives a driving environment surrounding the ADV using at least a portion of the sensors. The system analyzes the states in view of the driving environment to determine a real-time traffic condition at a point in time. The system determines whether the real-time traffic condition of the driving environment matches at least a predetermined traffic condition. The system transmits data concerning the real-time traffic condition to a remote server over a network to allow the remote server to generate an updated map having real-time traffic information, in response to determining the real-time traffic condition is unknown. In response to receiving the updated map, the system plans and controls the ADV based on the updated map.

16 Claims, 10 Drawing Sheets

(51) Int. Cl.
  *G08G 1/01* (2006.01)
  *G08G 1/0968* (2006.01)
  *G01C 21/32* (2006.01)
  *G08G 1/0969* (2006.01)
  *B60W 30/00* (2006.01)

(52) U.S. Cl.
  CPC ..... *G01C 21/3415* (2013.01); *G01C 21/3461* (2013.01); *G01C 21/3492* (2013.01); *G05D 1/0212* (2013.01); *G05D 1/0274* (2013.01); *G05D 1/0291* (2013.01); *G08G 1/0112* (2013.01); *G08G 1/0133* (2013.01); *G08G 1/0145* (2013.01); *G08G 1/0969* (2013.01); *G08G 1/096811* (2013.01); *G05D 2201/0213* (2013.01)

(56) References Cited

U.S. PATENT DOCUMENTS

| | | | |
|---|---|---|---|
| 10,558,224 B1* | 2/2020 | Lin | G08G 1/165 |
| 2009/0005962 A1* | 1/2009 | Shinto | G01C 21/3492 |
| | | | 701/532 |
| 2016/0356623 A1* | 12/2016 | Matsumoto | G08G 1/096811 |
| 2017/0167885 A1* | 6/2017 | Adderly | G01C 21/3626 |
| 2017/0262790 A1* | 9/2017 | Khasis | G08G 1/0116 |
| 2017/0352200 A1* | 12/2017 | Wang | H04W 4/44 |
| 2018/0003516 A1* | 1/2018 | Khasis | G08G 1/20 |
| 2018/0229737 A1* | 8/2018 | Towal | B60W 10/20 |
| 2018/0273050 A1* | 9/2018 | Tertoolen | G08G 1/096861 |
| 2019/0025071 A1* | 1/2019 | Fukui | G09B 29/10 |
| 2019/0049257 A1* | 2/2019 | Westover | G01C 21/28 |
| 2019/0114493 A1* | 4/2019 | Ewert | G06K 9/00818 |
| 2019/0174281 A1* | 6/2019 | Lim | G08G 1/052 |
| 2019/0197899 A1* | 6/2019 | Lim | G08G 1/0112 |

FOREIGN PATENT DOCUMENTS

| | | |
|---|---|---|
| CN | 105973245 A | 9/2016 |
| CN | 106996793 A | 8/2017 |
| JP | 2014123239 A | 7/2014 |
| JP | 2017090548 | 5/2017 |

* cited by examiner

SYSTEM FOR BUILDING A VEHICLE-TO-CLOUD REAL-TIME TRAFFIC MAP FOR AUTONOMOUS DRIVING VEHICLES (ADVS)

RELATED APPLICATIONS

This application claims priority of U.S. Provisional Patent Application No. 62/599,419, filed on Dec. 15, 2017, which is incorporated by reference herein in its entirety.

TECHNICAL FIELD

Embodiments of the present disclosure relate generally to operating autonomous vehicles. More particularly, embodiments of the disclosure relate to a system for building vehicle-to-cloud real-time traffic map for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle may have a very limited perception if relying only on its sensor system. It can detect its surroundings within certain distance if only using its sensors. Furthermore, it may have a hard time detecting unusual road conditions, such as a temporary road construction zone, with the current sensor technologies. An autonomous driving vehicle with its own built-in routing system may not route the smartest or fastest route without looking at real time road/traffic conditions miles away.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
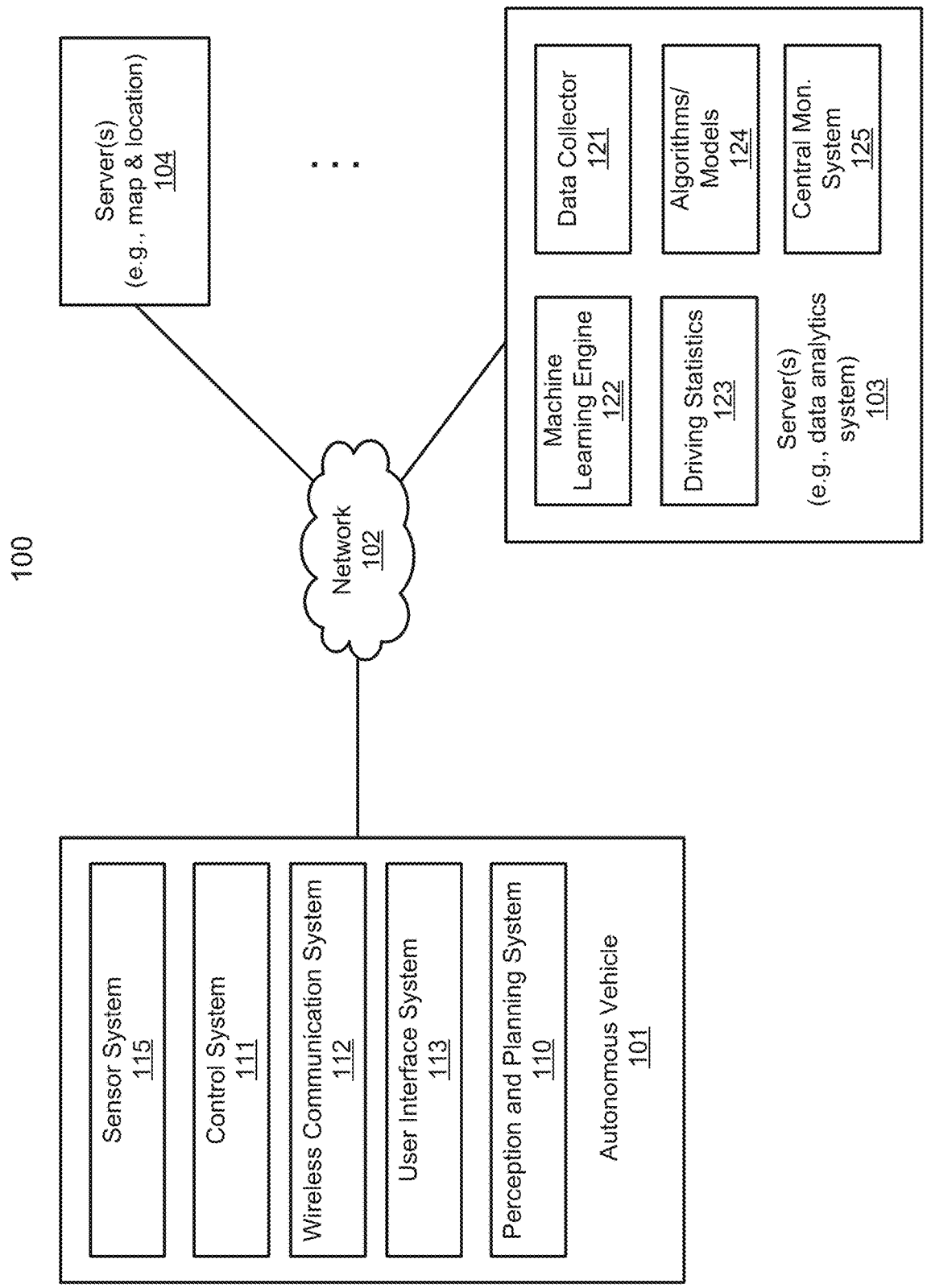
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a vehicle-to-cloud solution is designed for individual autonomous driving vehicles (ADVs) to detect real-time road conditions and for a central monitoring system to build a traffic map to broadcast and share among other ADVs.

According to one aspect, a system of an ADV monitors states of an autonomous driving vehicle (ADV) using a number of sensors mounted on the ADV. The system perceives a driving environment surrounding the ADV using at least a portion of the sensors. The system analyzes the states of the ADV in view of the driving environment surrounding the ADV to determine a real-time traffic condition of the driving environment at a point in time. The system determines whether the real-time traffic condition of the driving environment matches at least one of a number of predetermined traffic conditions. The system transmits data concerning the real-time traffic condition of the driving environment to a remote server over a network to allow the remote server to generate an updated map having real-time traffic information, in response to determining the real-time traffic condition is associated with a predetermined state (e.g., unknown). In response to receiving the updated map, the system plans and controls the ADV based on real-time traffic information obtained from the updated map.

According to another aspect, a central monitoring system receives certain types of (e.g., unknown) real-time traffic conditions from a first set of ADVs that are driving within a predetermined proximity of a road segment. The system examines each of the received real-time traffic conditions to determine a confidence score. The system determines whether the confidence score is greater than a predetermined threshold. The system modifies a map section of a map associated with the road segment to reflect the real-time traffic condition if the confidence score is above the predetermined threshold. The system broadcasts the modified map section to a second set of ADVs that are located within the proximity of the road segment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
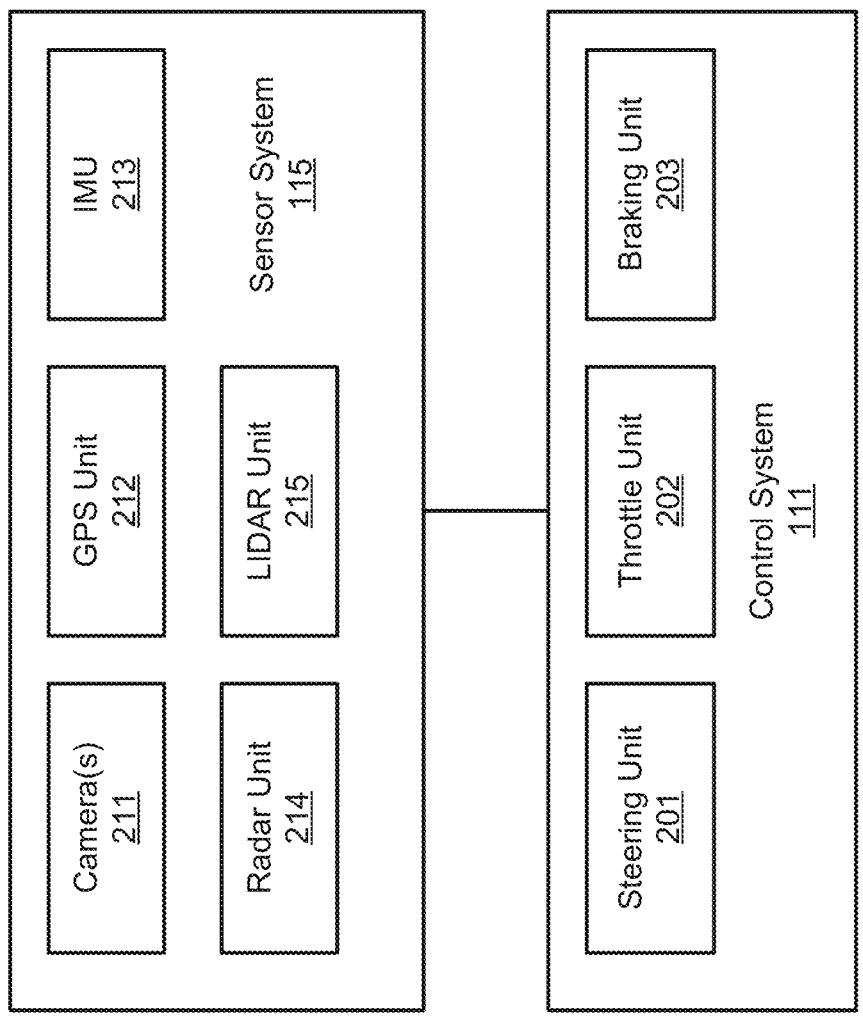
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including map update communication protocols between ADVs and a centralized map update server. Central monitoring system 125 may further process all the driving statistics such as the weather and/or traffic conditions to determine a respective confidence score for each of the weather and/or traffic conditions. Central monitoring system 125 may modify a traffic map which may be stored locally (e.g., server 103) or remotely (e.g., server 104) via an application programming interface (API) with weather and/or traffic conditions having a confidence score greater than a predetermined threshold. Central monitoring system 125 may then broadcast the updated traffic map to all ADVs interested in the traffic conditions, such as ADVs within proximity of the weather and/or traffic conditions.

Figure 3A:
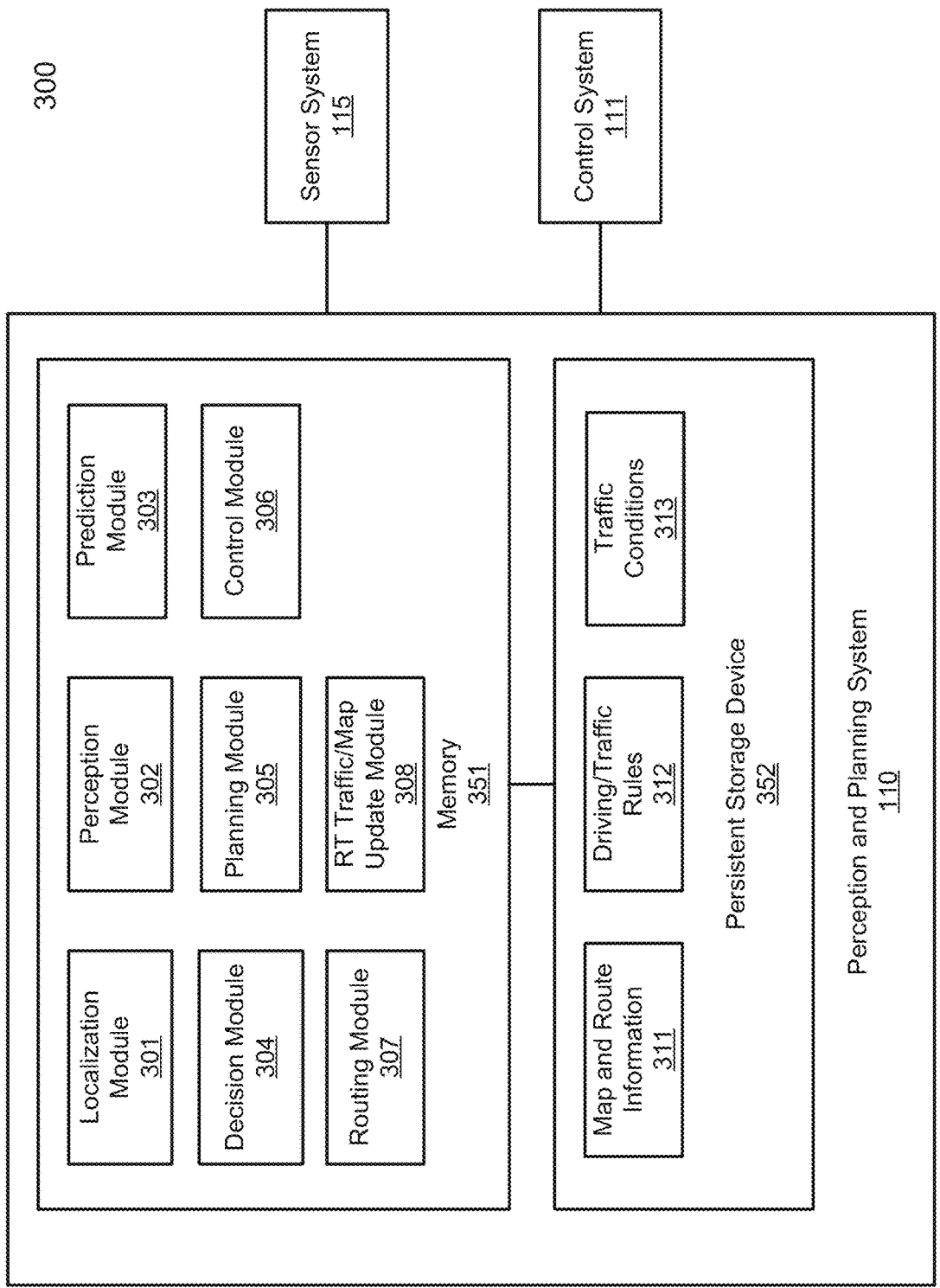
FIGS. 3A-3B are block diagrams illustrating an example of a perception and planning system used with an autonomous vehicle according to one embodiment.
Figure 3B:
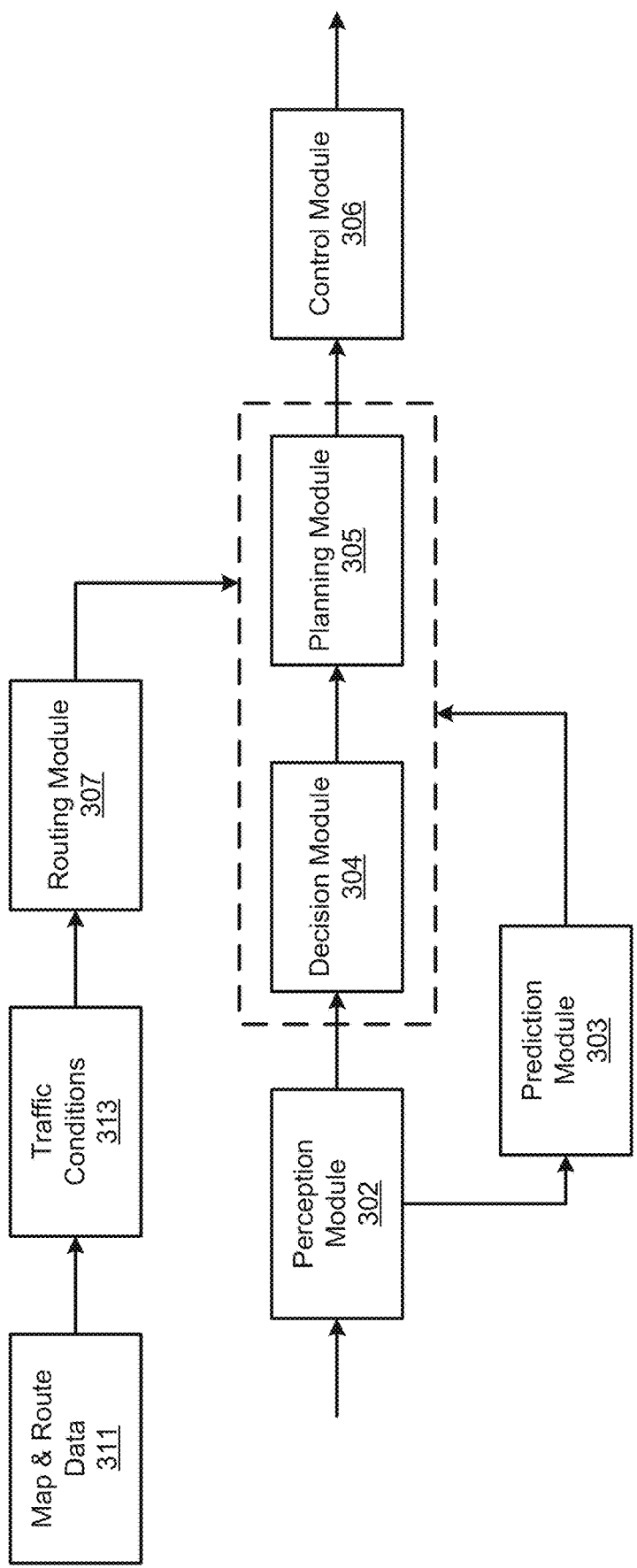

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, real-time traffic/map update module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point.

For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, real-time traffic/map update module 308 provides a vehicle-to-cloud solution designed for individual ADVs to detect real-time road conditions and stream the detected real-time road conditions to a central monitoring system (e.g., central monitoring system 125 of remote server 103) to build a traffic map to broadcast and share among other ADVs. If a real-time traffic condition is associated with a particular condition (e.g., unknown) in view of a set of traffic conditions 313 (e.g., traffic conditions from previous traffic map updates by remote server 103), a request is transmitted to a remote server over a network such as server 103 to allow the remote server to update the traffic map in view of other traffic conditions information obtained from other vehicles. The remote server then transmits the updated map having the real-time traffic information back to the ADV (if the ADV is still within the proximity of the same area) to enable the ADV to plan and control the vehicle using the updated map. In one embodiment, the updated map is also sent to any vehicles within the same area. In one embodiment, traffic map and/or traffic conditions reside on server 104 separate from server 103. Server 103 communicates with server 104 via a map service API to update the traffic map.

Figure 4:
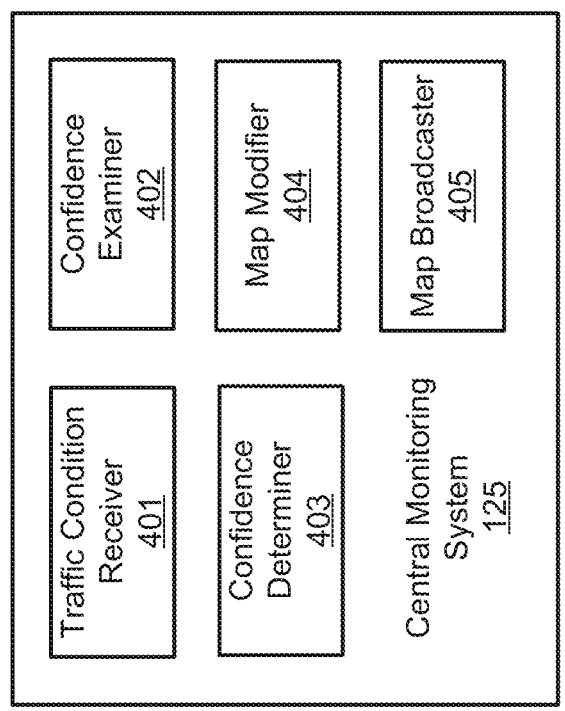
FIG. 4 is a block diagram illustrating an example of a central monitoring system according to one embodiment.

FIG. 4 is a block diagram illustrating an example of a central monitoring system according to one embodiment. Referring to FIG. 4, central monitoring system 125 can receive detected traffic conditions from a first set of ADVs, process the traffic conditions for a confidence level, and upload the traffic conditions to a traffic map server such as server 104, and later, to broadcast traffic conditions, via a broadcasting service, to a set of ADVs within proximity of the traffic conditions. Central monitoring system 125 includes traffic condition receiver 401, confidence examiner 402, confidence determiner 403, map modifier 404, and map broadcaster 405. Traffic condition receiver 401 can receive traffic conditions from a first set of ADVs. The first set of ADVs may be previously authenticated as trusted ADVs with server 103. Confidence examiner 402 can examine a confidence level for the received traffic conditions. Confidence determiner 403 can determine if the confidence level is above a threshold. Map modifier 404 can modify a traffic map based on a set of traffic conditions. Map broadcaster 405 can broadcast an updated traffic map to a second set of ADVs. Note that these modules can be integrated into fewer integrated modules, which can be implemented in software, hardware, or a combination thereof.

Figure 5:
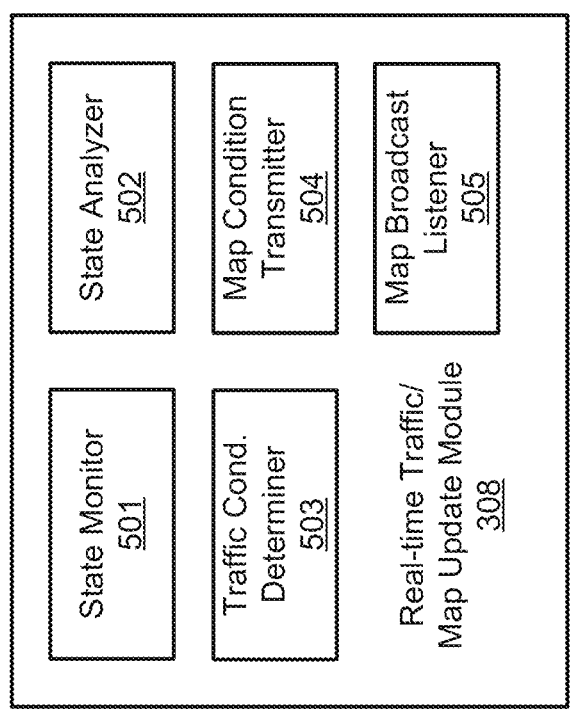
FIG. 5 is a block diagram illustrating an example of a map update module of an ADV according to one embodiment.

FIG. 5 is a block diagram illustrating an example of a real-time traffic/map update module of an ADV according to one embodiment. Referring to FIG. 5, real-time traffic/map update module 308 can detect a traffic condition by the ADV and can transmit a detected traffic condition to a remote server. Map update module 308 includes state monitor 501, state analyzer 502, traffic condition determiner 503, map condition transmitter 504, and map broadcast listener 505. State monitor 501 can monitor a state of the ADV (e.g., stopped, slowing down, speeding up, changing lanes, etc.). State analyzer 502 can analyzer the state of the ADV to determine if the ADV encountered a traffic condition. Traffic condition determiner 503 can determine if the encountered traffic condition is known by the ADV. Map condition transmitter 504 can transmit traffic conditions unknown to the ADV to a remote server, such as server 103. Map broadcast listener 505 can listen to traffic conditions broadcasted by a remote server, such as server 103. Note, real-time traffic/map update module 308 may be integrated with perception module 302 as a single module. Note that these modules can be integrated into fewer integrated modules, which can be implemented in software, hardware, or a combination thereof.

Figure 6:
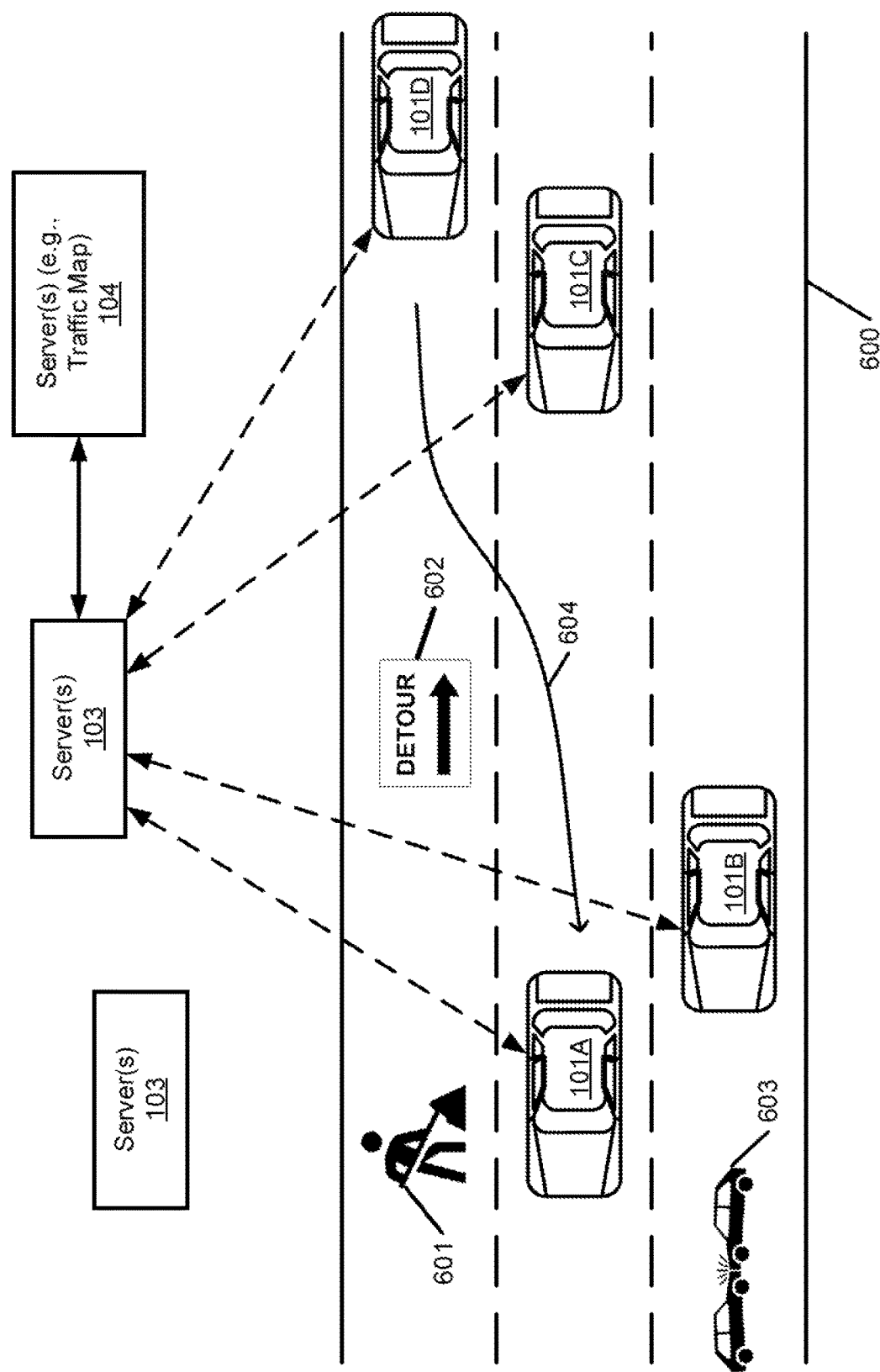
FIG. 6 is a block diagram illustrating an example for building a real-time traffic map according to one embodiment.

FIG. 6 is a block diagram illustrating an example for building a real-time traffic map according to one embodiment. Referring to FIG. 6, for the purpose of illustration, road 600 includes a set of traffic conditions, such as road under construction 601, temporary detour 602, and car accident 603. Individual ADVs 101A-D travelling along road 600 can detect real-time traffic conditions 601-603 via its sensors system and can transmit the detected traffic conditions to remote server 103. For example, while cruising along road 600, ADV 101D starts to slow down for conditions 601-602 detected by its sensor systems (the road conditions are not yet known to ADV 101D). State monitor 501 (of ADV 101D) detects a state change (e.g., slowing down, stopping) and state analyzer 502 analyzes the possible causes for the slow down (e.g., mechanical failures, traffic condition, red traffic light, etc.) in view of sensor data perceived by ADV 101D. E.g., sensor data may capture an image and detect the image to include a detour traffic sign or a red traffic light (detection via a trained model). Traffic condition determiner 503 then determines if the detected traffic conditions 601-602 are included in a predefined list of reportable traffic conditions. If they are reportable, i.e., within the predefined list, DV 101D reports or sends the detected traffic conditions 601-602 to remote server 103. Note, reportable types of traffic conditions may include slow traffic on highway moving less than a predetermined speed, e.g., 25 miles/hour (m/h), slow traffic on highway moving between a predetermined range, e.g., 25-50 m/h, stopped traffic, car accident, road construction, temporary detour, and/or unknown obstacles, etc. In one embodiment, an ADV only transmit the real-time traffic data to the server for map update if the ADV is required to reroute due to the detected traffic condition. In the normal operation, the ADV may not transmit the real-time traffic information to the server.

In this case, ADV 101D reports traffic conditions 601-602 (road construction 601 and detour 602), unknown to ADV 101D, by transmitting traffic condition information to remote server 103. Traffic information includes an ID of the reporting ADV, a location for the traffic condition, the type of traffic condition, affected areas, and the time of detection. Server 103 receives the traffic condition information (via traffic condition receiver 401) for monitoring. Confidence examiner 402 examines the traffic condition information reported by ADV 101D with traffic conditions information reported by other vehicles (which can be ADVs or regular vehicles) in the surrounding vicinity. For example, ADV 101A may have also reported conditions 601-602 to remote server 303 and had changed lanes along line 604. In this case, confidence determiner 403 can determine the reported traffic conditions are reported by more than a threshold number of vehicles (e.g., two or more vehicles), by comparing locations, similarity of the driving environments, and an overlap of detection times from multiple reports of traffic conditions information. In response to determining the confidence is greater than a threshold (e.g., reported by two or more vehicles in this case), map modifier 404 transmits the traffic conditions to a traffic map server, e.g., server 104, via a map service API to update the traffic map. Map broadcaster 405 can then broadcasts the updated traffic map to all vehicles subscribed to the broadcasting service. Note, traffic map can be stored on server 104 as layers, to make it scalable to add different road conditions information. In one embodiment, each layer can represent a different type of traffic condition.

Thus, ADVs 101A-D can simultaneously subscribe to a traffic broadcast service from remote server 103, to listen in for traffic map updates which have yet to be perceived by a sensor system of the ADC's, while at the same time, transmit unknown traffic conditions to remote server 103. For example, ADV 101C can listen to a broadcast to learn about traffic conditions 601-602 via map broadcast listener 505 even though the sensor system of ADV 101C does not pick up the traffic conditions 601-602. In another scenario, when the temporary detour 602 is removed, e.g., a disappearance of a known traffic condition, ADVs perceiving the known but disappearing traffic condition can similarly transmit known but disappearing traffic condition to remote server 103. Remote server 103 determines a confidence score for the known but disappearing traffic condition. If remote server 103 determines that the confidence score is above a threshold, e.g., two or more vehicles reported the same condition, then remote server 103 updates the traffic map (e.g., server 104) and broadcasts the updated traffic map to all vehicles subscribed to the broadcasting service.

Upon receiving a traffic map update or broadcast, the traffic map update broadcast can influence an ADV on how a reference line is routed by the ADV from an initial to a destination location. For example, traffic map updates or broadcasts can cause an ADV to update an existing route by selecting a new route, via a routing module of the ADV, such as routing module 307 of FIG. 3A, to replace an old route if the traffic map update broadcasts include traffic conditions along the old route. In one embodiment, routing module 307 prompts a user or passenger of the ADV to confirm the new route.

Thus, the central monitoring system can generate a real-time traffic map and broadcast to all the ADVs reading that portion of map (e.g., within a predetermined area associated with the map portion). Individual ADVs can then use real-time traffic information to optimize their driving, including prompting passenger to confirm rerouting when there is traffic jam miles away, saving computing time (or improve accuracy) to detect unusual road conditions such as road construction, road detour situation, etc.

Figure 7:
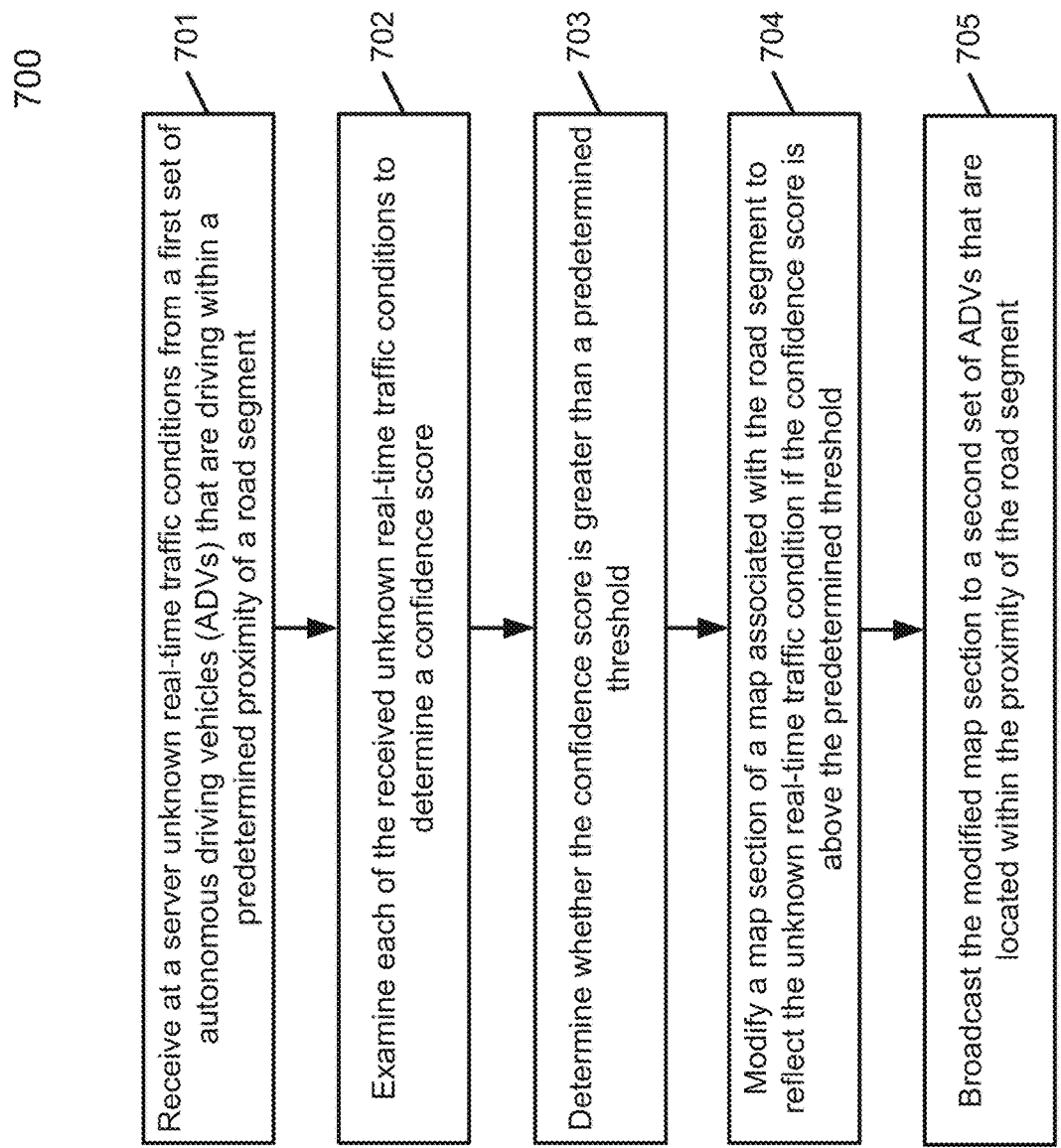
FIG. 7 is a flow diagram illustrating a method performed by a central monitoring system according to one embodiment.

FIG. 7 is a flow diagram illustrating a method performed by a central monitoring system according to one embodiment. Processing 700 may be performed by processing logic which may include software, hardware, or a combination thereof. For example, process 700 may be performed by central monitoring system 125 of FIG. 1. Referring to FIG. 7, at block 701, processing logic receives unknown real-time traffic conditions from a first set of autonomous driving vehicles (ADVs) that are driving within a predetermined proximity of a road segment. At block 702, processing logic examines each of the received unknown real-time traffic conditions to determine a confidence score. At block 703, processing logic determines whether the confidence score is greater than a predetermined threshold. At block 704, processing logic modifies a map section of a map associated with the road segment to reflect the unknown real-time traffic condition if the confidence score is above the predetermined threshold. At block 705, processing logic broadcasts the modified map section to a second set of ADVs that are located within the proximity of the road segment.

In one embodiment, processing logic receives at a server disappearance of a predetermined type (e.g., known) real-time traffic conditions from the first set of ADVs that are driving within the predetermined proximity of the road segment. Processing logic examines each of the received disappearance of real-time traffic conditions to determine a confidence score, for example, based on a number of vehicles reporting the same traffic condition. Processing logic determines whether the confidence score is above a second predetermined threshold. Processing logic modifies a map section of a map associated with the road segment to reflect the disappearance of the real-time traffic condition if the confidence score is above the second predetermined threshold. Processing logic broadcasts the modified map section to the second set of ADVs that are located within the proximity of the road segment.

In another embodiment, the disappearance of real-time traffic conditions include obstacles which were previously perceived, but no longer perceived, by the first set of ADVs. In another embodiment, the second predetermined threshold is a configurable threshold configured based on sensitivity of the number of sensors of the first set of ADVs.

In one embodiment, each map section includes a map structure having one or more map layers, where each of the one or more map layers stores a different real-time traffic condition. In another embodiment, modifying a map section includes calling a map service application programming interface (API) and modifying one or more map layers of the map section. In another embodiment, the real-time traffic conditions include: slow traffic on highway moving less than a predetermined threshold, slow traffic on highway moving between a predetermined range, stopped traffic, car accident, road construction, temporary detour, or unknown obstacles.

Figure 8:
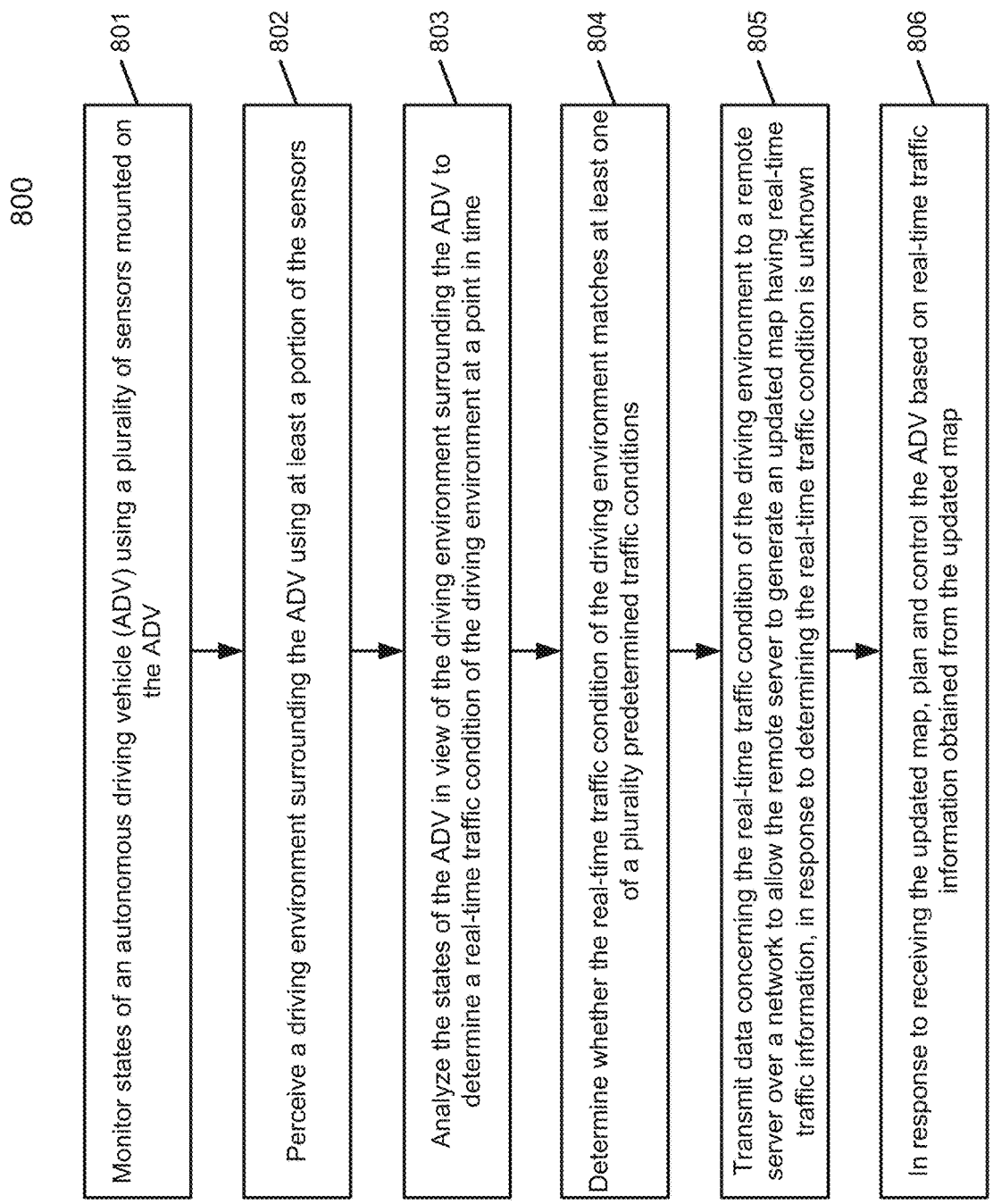
FIG. 8 is a flow diagram illustrating a method performed by an ADV according to one embodiment.

FIG. 8 is a flow diagram illustrating a method performed by an ADV according to one embodiment. Processing 800 may be performed by processing logic which may include software, hardware, or a combination thereof. For example, process 800 may be performed by real-time traffic/map update module 308 of FIG. 3A. Referring to FIG. 8, at block 801, processing logic monitors states of an ADV using a number of sensors mounted on the ADV. At block 802, processing logic perceives a driving environment surrounding the ADV using at least a portion of the sensors. At block 803, processing logic analyzes the states of the ADV in view of the driving environment surrounding the ADV to determine a real-time traffic condition of the driving environment at a point in time. At block 804, processing logic determines whether the real-time traffic condition of the driving environment matches at least one of the predetermined traffic conditions. At block 805, processing logic transmits data concerning the real-time traffic condition of the driving environment to a remote server over a network to allow the remote server to generate an updated map having real-time traffic information, in response to determining the real-time traffic condition is unknown. At block 806, in response to receiving the updated map, processing logic plans and controls the ADV based on real-time traffic information obtained from the updated map.

In one embodiment, the remote server is configured to receive data concerning the unknown real-time traffic condition from a number of vehicles, to update the map based on the unknown real-time traffic condition from all of the vehicles, and to transmit the updated map back to all of the vehicles. In another embodiment, the map to be updated includes one or more map layers to store real-time traffic conditions. In another embodiment, the real-time traffic conditions includes: slow traffic on highway moving less than a predetermined threshold, slow traffic on highway moving between about a predetermined range, stopped traffic, car accident, road construction, temporary detour, or unknown obstacles.

In one embodiment, processing logic further prompts a user of the ADV to confirm a rerouting of the ADV based on the real-time traffic information obtained from the updated map. In one embodiment, processing logic further transmits data concerning a disappearance of a real-time traffic condition of the driving environment to a remote server over a network to allow the remote server to generate an updated map having real-time traffic information, in response to determining the real-time traffic condition is known but disappearing. In another embodiment, the remote server is configured to receive data concerning the disappearance of known real-time traffic condition from a number of vehicles, to update the map based on the disappearance of known real-time traffic condition from all of the vehicles, and to transmit the updated map back to all of the vehicles.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
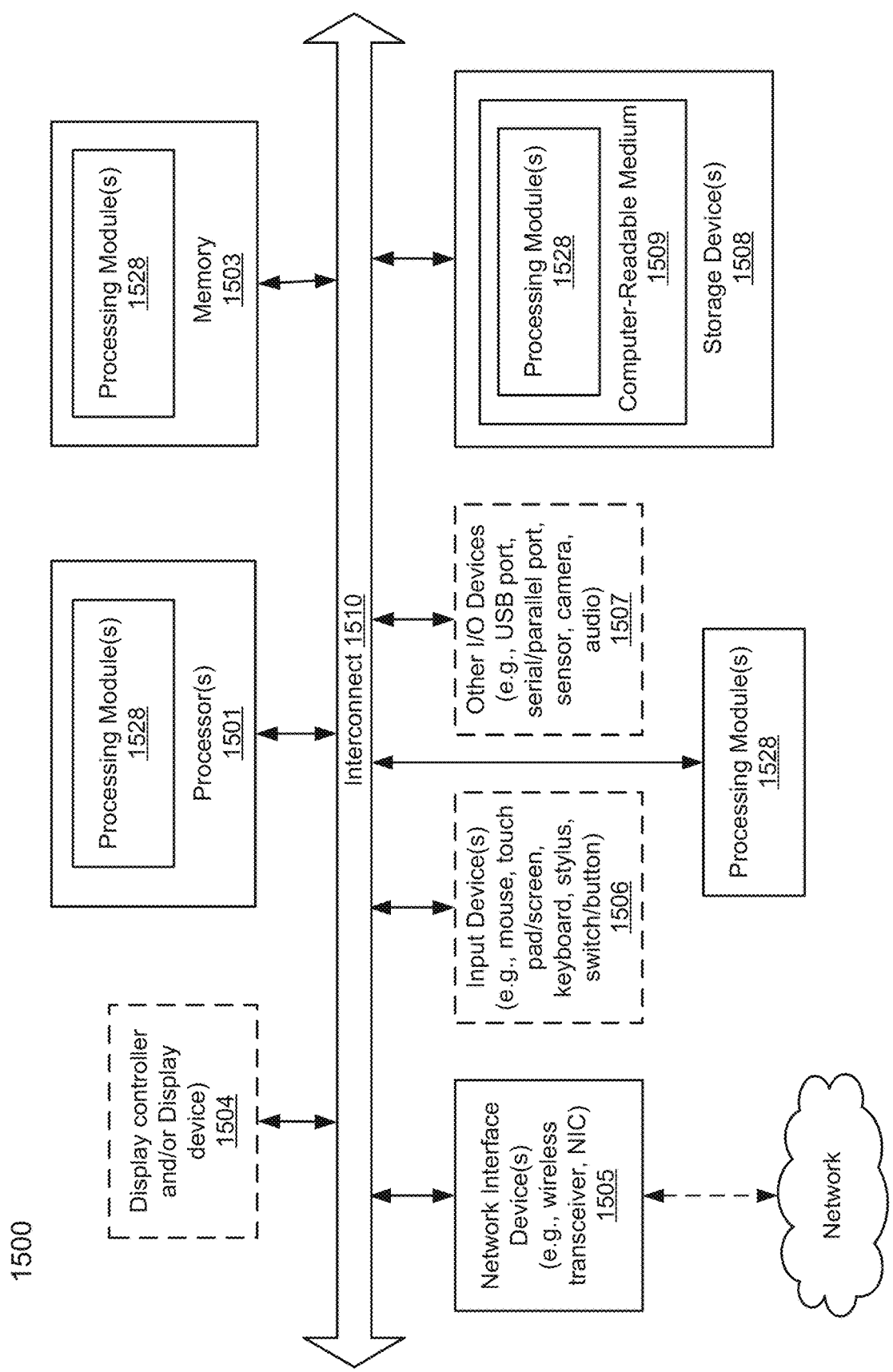
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110, central monitoring system 125, or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or real-time traffic/map update module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
monitoring a state change of an autonomous driving vehicle (ADV) using a plurality of sensors mounted on the ADV;
detecting a driving environment surrounding the ADV using at least a portion of the sensors;
analyzing causes for the state change of the ADV in view of the driving environment surrounding the ADV to determine a real-time traffic condition of the driving environment at a point in time;

determining whether the real-time traffic condition of the driving environment is unknown by matching the real-time traffic condition with at least one of a plurality of predetermined traffic conditions, wherein the plurality of predetermined traffic conditions comprise slow traffic on highway moving less than a predetermined threshold, slow traffic on highway moving between about a predetermined range, road construction, and temporary detour;

in response to the real-time traffic condition being determined to be unknown, determining whether the real-time traffic condition is reported by more than a threshold number of vehicles, wherein the determining comprises comparing locations of the real-time traffic condition, similarity of driving environments, and an overlap of detection times from multiple reports of traffic conditions information;

in response to the real-time traffic condition being determined to be unknown, transmitting data concerning the real-time traffic condition of the driving environment to a remote server over a network, wherein the transmitted data includes the unknown real-time traffic condition including an ID of a reporting ADV, a location for the real-time traffic condition, a type of the real-time traffic condition, and a time of detection of the real-time traffic condition, wherein the transmitted data associated with the ADV are authenticated by the remote server, wherein the remote server is to modify a map section of a map associated with a road segment to generate and broadcast the modified map section an updated map to ADVs operating within a predetermined area associated with a portion of the updated map having real-time traffic information based on the transmitted unknown real-time traffic condition, the server communicating with the remote server via a map service application programming interface (API) to update the map; and in response to receiving the updated map, planning and controlling the ADV based on real-time traffic information obtained from the updated map.

2. The method of claim 1, wherein the remote server is configured to receive data concerning the unknown real-time traffic condition from at least one of a plurality of vehicles, examine weather condition and each of the received unknown real-time traffic conditions with traffic conditions information reported by other vehicles in a surrounding vicinity, determine whether a confidence score for each of the weather condition and the real-time traffic conditions is greater than a predetermined threshold, wherein the predetermined threshold is calculated based on a number of reporting vehicles, to update the map based on the unknown real-time traffic condition from the plurality of the vehicles via an application programming interface (API), and to transmit the updated map back to a set of the plurality of the vehicles interested in the real-time traffic conditions, the set of the plurality of the vehicles being within proximity of the weather condition and the real-time traffic conditions.

3. The method of claim 2, wherein the map to be updated comprises one or more map layers to store real-time traffic conditions.

4. The method of claim 1, further comprising prompting a user of the ADV to confirm a rerouting of the ADV based on the real-time traffic information obtained from the updated map.

5. The method of claim 1, further comprising transmitting data concerning a disappearance of a real-time traffic condition of the driving environment to a remote server over a network wherein the transmitting, by the remote server, to generate an updated map having real-time traffic information, in response to determining the real-time traffic condition is known but disappearing, the disappearance of the real-time traffic condition include obstacles which were previously perceived, but no longer perceived, by the ADV, wherein map update communication protocols between the remote server and the ADVs are updated using trained predictive models based on driving statistics.

6. The method of claim 5, wherein the remote server is configured to receive data concerning the disappearance of known real-time traffic condition from at least one of a plurality of vehicles, to update the map based on the disappearance of known real-time traffic condition from the plurality of the vehicles, and to transmit the updated map back to the plurality of the vehicles.

7. The method of claim 1, wherein the state change includes stopping, slowing down, speeding up, and changing lanes.

8. A non-transitory machine-readable medium having instructions stored therein, which when executed by one or more processors, cause the one or more processors to perform operations, the operations comprising:

monitoring a state change of an autonomous driving vehicle (ADV) using a plurality of sensors mounted on the ADV;

detecting a driving environment surrounding the ADV using at least a portion of the sensors;

analyzing causes for the state change of the ADV in view of the driving environment surrounding the ADV to determine a real-time traffic condition of the driving environment at a point in time;

determining whether the real-time traffic condition of the driving environment is unknown by matching the real-time traffic condition with at least one of a plurality of predetermined traffic conditions, wherein the plurality of predetermined traffic conditions comprise slow traffic on highway moving less than a predetermined threshold, slow traffic on highway moving between about a predetermined range, road construction, and temporary detour;

in response to the real-time traffic condition being determined to be unknown, determining whether the real-time traffic condition is reported by more than a threshold number of vehicles, wherein the determining comprises comparing locations of the real-time traffic condition, similarity of driving environments, and an overlap of detection times from multiple reports of traffic conditions information;

in response to the real-time traffic condition being determined to be unknown, transmitting data concerning the real-time traffic condition of the driving environment to a remote server over a network, wherein the transmitted data includes the unknown real-time traffic condition including an ID of a reporting ADV, a location for the real-time traffic condition, a type of the real-time traffic condition, and a time of detection of the real-time traffic condition, wherein the transmitted data associated with the ADV are authenticated by the remote server, wherein the remote server is to modify a map section of a map associated with a road segment to generate and broadcast an updated map to ADVs operating within a predetermined area associated with a portion of the updated map having real-time traffic information based on the transmitted unknown real-time traffic condition, the server communicating with the remote server via a map service application programming interface (API) to update the map; and in response to receiving the updated map, planning and controlling the ADV based on real-time traffic information obtained from the updated map.

9. The non-transitory machine-readable medium of claim 8, wherein the remote server is configured to receive data concerning the unknown real-time traffic condition from at least one of a plurality of vehicles, examine weather condition and each of the received unknown real-time traffic conditions with traffic conditions information reported by other vehicles in a surrounding vicinity, determine whether a confidence score for each of the weather conditions and the real-time traffic conditions is greater than a predetermined threshold, wherein the predetermined threshold is calculated based on a number of reporting vehicles, to update the map based on the unknown real-time traffic condition from the plurality of the vehicles via an application programming interface (API), and to transmit the updated map back to a set of the plurality of the vehicles interested in the real-time traffic conditions, the set of the plurality of the vehicles being within proximity of the weather condition and the real-time traffic conditions.

10. The non-transitory machine-readable medium of claim 8, further comprising prompting a user of the ADV to confirm a rerouting of the ADV based on the real-time traffic information obtained from the updated map.

11. The non-transitory machine-readable medium of claim 8, further comprising transmitting data concerning a disappearance of a real-time traffic condition of the driving environment to a remote server over a network, wherein the transmitting, by the remote server, to generate an updated map having real-time traffic information, in response to determining the real-time traffic condition is known but disappearing, the disappearance of the real-time traffic condition include obstacles which were previously perceived, but no longer perceived, by the ADV, wherein map update communication protocols between the remote server and the ADVs are updated using trained predictive models based on driving statistics.

12. A data processing system, comprising:
a processor; and
a memory coupled to the processor to store instructions, which when executed by the processor, cause the processor to perform operations, the operations including:
monitoring a state change of an autonomous driving vehicle (ADV) using a plurality of sensors mounted on the ADV;
detecting a driving environment surrounding the ADV using at least a portion of the sensors;
analyzing causes for the state change of the ADV in view of the driving environment surrounding the ADV to determine a real-time traffic condition of the driving environment at a point in time;
determining whether the real-time traffic condition of the driving environment is unknown by matching the real-time traffic condition with at least one of a plurality of predetermined traffic conditions, wherein the plurality of predetermined traffic conditions comprise slow traffic on highway moving less than a predetermined threshold, slow traffic on highway moving between about a predetermined range, road construction, and temporary detour;
in response to the real-time traffic condition being determined to be unknown, determining whether the real-time traffic condition is reported by more than a threshold number of vehicles, wherein the determining comprises comparing locations of the real-time traffic condition, similarity of driving environments, and an overlap of detection times from multiple reports of traffic conditions information;

in response to the real-time traffic condition being determined to be unknown, transmitting data concerning the real-time traffic condition of the driving environment to a remote server over a network, wherein the transmitted data includes the unknown real-time traffic condition including an ID of a reporting ADV, a location for the real-time traffic condition, a type of the real-time traffic condition, and a time of detection of the real-time traffic condition, wherein the transmitted data associated with the ADV are authenticated by the remote server, wherein the remote server is to modify a map section of a map associated with a road segment to generate and broadcast an updated map to ADVs operating within a predetermined area associated with a portion of the updated map having real-time traffic information based on the transmitted unknown real-time traffic condition, the server communicating with the remote server via a map service application programming interface (API) to update the map; and in response to receiving the updated map, planning and controlling the ADV based on real-time traffic information obtained from the updated map.

13. The system of claim 12, wherein the remote server is configured to receive data concerning the unknown real-time traffic condition from at least one of a plurality of vehicles, examine weather condition and each of the received unknown real-time traffic conditions with traffic conditions information reported by other vehicles in a surrounding vicinity, determine whether a confidence score for each of the weather conditions and the real-time traffic conditions is greater than a predetermined threshold, wherein the predetermined threshold is calculated based on a number of reporting vehicles, to update the map based on the unknown real-time traffic condition from the plurality of the vehicles via an application programming interface (API), and to transmit the updated map back to a set of the plurality of the vehicles interested in the real-time traffic conditions, the set of the plurality of the vehicles being within proximity of the weather condition and the real-time traffic conditions.

14. The system of claim 13, wherein the map to be updated comprises one or more map layers to store real-time traffic conditions.

15. The system of claim 12, wherein the operations further comprise prompting a user of the ADV to confirm a rerouting of the ADV based on the real-time traffic information obtained from the updated map.

16. The system of claim 12, wherein the operations further comprise transmitting data concerning a disappearance of a real-time traffic condition of the driving environment to a remote server over a network, wherein the transmitting, by the remote server, to generate an updated map having real-time traffic information, in response to determining the real-time traffic condition is known but disappearing, the disappearance of the real-time traffic condition include obstacles which were previously perceived, but no longer perceived, by the ADV, wherein map update communication protocols between the remote server and the ADVs are updated using trained predictive models based on driving statistics.

* * * * *